UNITED STATES PATENT OFFICE.

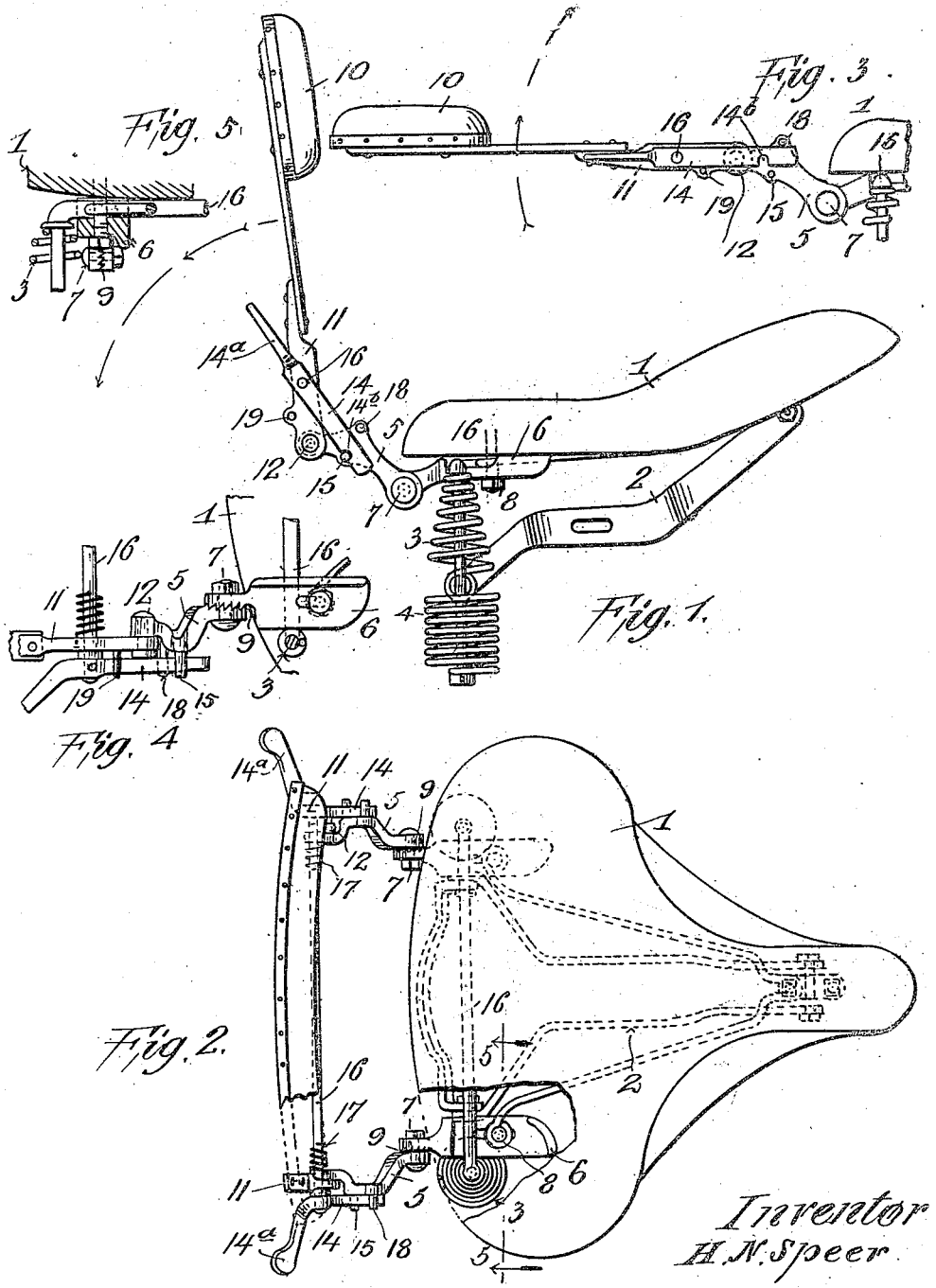

HORACE N. SPEER, OF SCARSDALE, NEW YORK.

BACK-REST.

1,380,935.         Specification of Letters Patent.         Patented June 7, 1921.

Application filed July 5, 1919. Serial No. 308,705.

*To all whom it may concern:*

Be it known that I, HORACE N. SPEER, a citizen of the United States, and resident of Scarsdale, in the county of Westchester and State of New York, have invented certain new and useful Improvements in Back-Rests, of which the following is a specification.

My invention relates to improvements in adjustable back rests for seats and is particularly adapted for use on seats for motor cycles, bicycles and the like.

The object of my invention is to provide means whereby a back rest on a seat may be retained in position for use and may be easily moved back and retained in a different position.

My invention comprises a back rest having arms pivotally connected to braces carried by a seat, with one or more latch members having notches pivotally carried by the back rest, the notch being coöperative with a projection upon the brace whereby when said notch and projection coöperate the seat back will be retained in operative position for use and when the latch is released from said projection the back rest may be lowered behind the seat. Stops upon the corresponding arm and brace are coöperative with the latch to retain the seat back in a lowered position.

My invention also comprises novel details of improvement and combinations of parts that will be more fully hereinafter set forth and then pointed out in the claims.

Reference is to be had to the accompanying drawings forming a part hereof, wherein—

Figure 1 is a side elevation of a seat provided with my improvements;

Fig. 2 is a partly broken plan view thereof;

Fig. 3 is a detail side view showing the seat rest in lowered position;

Fig. 4 is a detail underside view;

Fig. 5 is a cross section on the line 5—5 in Fig. 2.

A seat 1 may be of any suitable construction such as usually used upon motor cycles, bicycles and the like, and is shown provided with a brace 2 for its support, and springs 3, 4 coöperative with the seat and brace. Braces 5 are shown adjustably attached to members 6 by means of bolts 7, which members are secured to the seat by bolts 8. The bolts 7 permit adjustment of the braces 5 with relation to the seat, and interengaging serrations or teeth at 9 respectively upon the braces 5 and members 6 serve to retain the braces in set position. The seat back 10 is provided with depending arms 11 that are pivotally supported at 12 upon braces 5. Latches 14 having extended finger pieces 14$^a$ are pivotally carried by the arms 11, which latches have notches 14$^b$ in their lower edges to receive stops or projections 15 upon braces 5, the latches being operative along the sides of the corresponding braces. Cross rod 16 is preferably pivotally supported in arms 11 and extends therebetween, to the outer ends of which rod the latches 14 are secured, as by pins, whereby said latches can be used on opposite sides of said back so that upon operation of one latch both latches will be moved. One or more springs 17 secured to rod 16 and to adjacent arm 11 (Fig. 4) tend to cause the notched ends of the latches to move toward the corresponding projection 15 whereby to retain said projection and notch 14$^b$ together when the back rest is in position for use, (Fig. 1). The braces 5 have projections 18 spaced from projections 15, above the corresponding latch to engage the same, and the arms 11 have projections 19 behind or below the latches and on the side of pivots 12 opposite projection 18 to engage the corresponding latch between the pivotal point 12 and rod 16, whereby when the seat back 10 is lowered the latch will engage the corresponding projections 18, 19 for retaining the seat back in lowered position, (Fig. 3).

When the seat back is to be set for use it is merely necessary to raise it from the position shown in Fig. 3 to the position shown in Fig. 1, whereby the arms 11 will rotate on pivots 12 and the latches 14 will, by springs 17, be moved to cause engagement of the notches 14$^b$ with projections 15 for retaining the seat back in elevated position for use as indicated in Fig. 1. When it is desired to lower the seat back it is merely necessary to swing the latches 14, as by pressing down upon the finger piece 14$^a$, to release the notches 14$^b$ from projections 15, whereupon the seat back will swing back to the position shown in Fig. 3 and it will be retained by the latches and projections 18, 19 as before described.

While I have illustrated two latches with corresponding projections 15 coöperative therewith and the rod 16 connecting said latches whereby both the arms 11 of said back rest will be braced by the latches against the braces 5, and whereby both latches may be operated together by operation of the one, it will be understood that a single latch 14 on one of the arms may be utilized if preferred.

My improvements are simple in construction, cheap to manufacture, may be readily operated, and are not liable to get out of order.

Having thus described my invention, what I claim and desire to secure by Letters Patent is:—

1. The combination of a back rest, braces pivotally connected thereto, means to secure the braces to a seat, a rod carried by the back rest, and latches secured to the rod, said braces having projections, the latches having notches coöperative with said projections to retain the back rest in elevated position, and a spring coöperative with said rod and with the back rest to cause the notches of the latches to remain in coöperation with said projections when the back rest is elevated.

2. The combination of a back rest, braces pivotally connected thereto, means to secure the braces to a seat, a rod carried by the back rest, and latches secured to the rod, said braces having projections, the latches having notches coöperative with said projections to retain the back rest in elevated position, said braces having projections spaced from the first named projections with the latches therebetween, said back rest having projections on the side of the latches opposite the second named projections, whereby the second and third named projections coöperate with the latches to retain the rest in lowered position.

Signed at New York in the county of New York and State of New York this 3rd day of July, A. D. 1919.

HORACE N. SPEER.